United States Patent
Urmston et al.

(10) Patent No.: US 8,161,013 B2
(45) Date of Patent: Apr. 17, 2012

(54) IMPLEMENTING APPLICATION SPECIFIC MANAGEMENT POLICIES ON A CONTENT ADDRESSED STORAGE DEVICE

(75) Inventors: Richard Urmston, Westboro, MA (US); William McConnell, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 1641 days.

(21) Appl. No.: 10/984,678

(22) Filed: Nov. 8, 2004

(65) Prior Publication Data

US 2006/0112299 A1    May 25, 2006

(51) Int. Cl.
*G06F 17/30* (2006.01)

(52) U.S. Cl. ......... 707/694; 707/736; 707/792; 707/802

(58) Field of Classification Search ............. 707/1, 5, 707/9, 10, 100, 103, 694, 736, 792, 802; 714/5
See application file for complete search history.

(56) References Cited

U.S. PATENT DOCUMENTS

| | | | |
|---|---|---|---|
| 6,006,332 A * | 12/1999 | Rabne et al. ............... | 726/6 |
| 6,298,401 B1 | 10/2001 | Anderson | |
| 6,567,818 B1 * | 5/2003 | Frey et al. ............... | 707/103 R |
| 6,598,147 B1 | 7/2003 | Segawa | |
| 6,606,681 B1 | 8/2003 | Uzun | |
| 6,621,505 B1 | 9/2003 | Beauchamp et al. | |
| 6,925,524 B2 | 8/2005 | Chow et al. | |
| 7,133,963 B2 | 11/2006 | Gilfix et al. | |
| 7,143,231 B1 | 11/2006 | Srinivasan et al. | |
| 2002/0178271 A1 * | 11/2002 | Graham et al. ............... | 709/229 |
| 2003/0070006 A1 | 4/2003 | Nadler et al. | |
| 2003/0191992 A1 | 10/2003 | Kaminsky et al. | |
| 2004/0019670 A1 | 1/2004 | Viswanath | |
| 2004/0205077 A1 | 10/2004 | Cabrera et al. | |

FOREIGN PATENT DOCUMENTS

| | | |
|---|---|---|
| EP | 893902 | 1/1999 |
| WO | WO 97/44762 | 11/1997 |
| WO | WO 99/08173 | 2/1999 |
| WO | WO 2004/074968 | 9/2004 |

OTHER PUBLICATIONS

Daniel Gilly and the Staff O'Reilly & Associates, Inc., UNIX in a Nutshell, 1994, System V Edition, pp. 2-47 and 2-48.
Tolia et al., "Opportunistic use of Content Addressable Storage for Distributed File Systems," Proceedings of the USENIX Annual Technical Conference, General Track 2003. Jun. 2003.
Gilly er al., "UNIX in a Nutshell", 1992, O'Reilly & Associates, pp. 2-47 and 2-48.

* cited by examiner

*Primary Examiner* — Tim T. Vo
*Assistant Examiner* — Dangelino Gortayo
(74) *Attorney, Agent, or Firm* — Van Pelt, Yi & James LLP

(57) ABSTRACT

Implementing application specific management policies on a content addressed storage device is disclosed. In one embodiment, each data object stored on the content addressed storage device is associated with one of a plurality of data sets. A corresponding data set specific management policy is associated with at least each of a subset of said plurality of data sets. The applicable data set specific management policy is applied to the data objects of each data set with which a corresponding data set specific management policy has been associated.

21 Claims, 5 Drawing Sheets

IMPLEMENTING APPLICATION SPECIFIC MANAGEMENT POLICIES ON A CONTENT ADDRESSED STORAGE DEVICE

CROSS REFERENCE TO OTHER APPLICATIONS

Co-pending U.S. patent application Ser. No. 10/984,687 entitled CONTENT ADDRESSED STORAGE DEVICE WITH WEB SERVICES INTERFACE filed Nov. 8, 2004 is incorporated herein by reference for all purposes; and co-pending U.S. patent application Ser. No. 10/984,686 entitled CONTENT ADDRESSED STORAGE DEVICE CONFIGURED TO MAINTAIN CONTENT ADDRESS MAPPING Nov. 8, 2004 is incorporated herein by reference for all purposes.

FIELD OF THE INVENTION

The present invention relates generally to data storage. More specifically, implementing application specific management policies on a content addressable storage device is disclosed.

BACKGROUND OF THE INVENTION

Content addressed storage (CAS) devices store typically fixed content, perhaps from many sources, in a storage server typically accessed via a network. An example is the Centera™ CAS device made and sold by EMC™ Corporation of Hopkinton, Mass. Typically, an application sends data to the CAS device to be stored, the CAS device determines a storage location by calculating a "content address" (CA) based at least in part on the content to be stored, after which the CAS device stores the content in the selected location and returns the content address to the application that sent the data. The content address is used like a claim check to enable the storing application (or, in theory, another application to which the CA has been provided) to retrieve (and in some cases perform other limited operations, e.g., delete) the previously stored content.

In a typical CAS device, the same management policies, e.g., data retention policies, are applied to all data, regardless of the source. A typical CAS device has no native file system or other way to identify a particular data object as coming from a particular source (e.g., application). In many cases, however, different policies may apply to different data, depending e.g., on the content and/or the application or other process that created and/or stored the data. In current CAS devices, normally the more restrictive (e.g., longest retention period) policy is applied to all data, which results in some data being retained, e.g., much longer than is required, needlessly tying up storage resources that could otherwise be used to store other data. Therefore, there is a need for a way to apply application (or other data set) specific management policies, such as data retention policies, to data stored in a CAS device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Implementing application specific management policies on a content addressable storage device is disclosed. In one embodiment, each data object stored on the content addressed storage device is associated with one of a plurality of data sets. A corresponding data set specific management policy is associated with at least each of a subset of said plurality of data sets. The applicable data set specific management policy is applied to the data objects of each data set with which a corresponding data set specific management policy has been associated.

Figure 1:
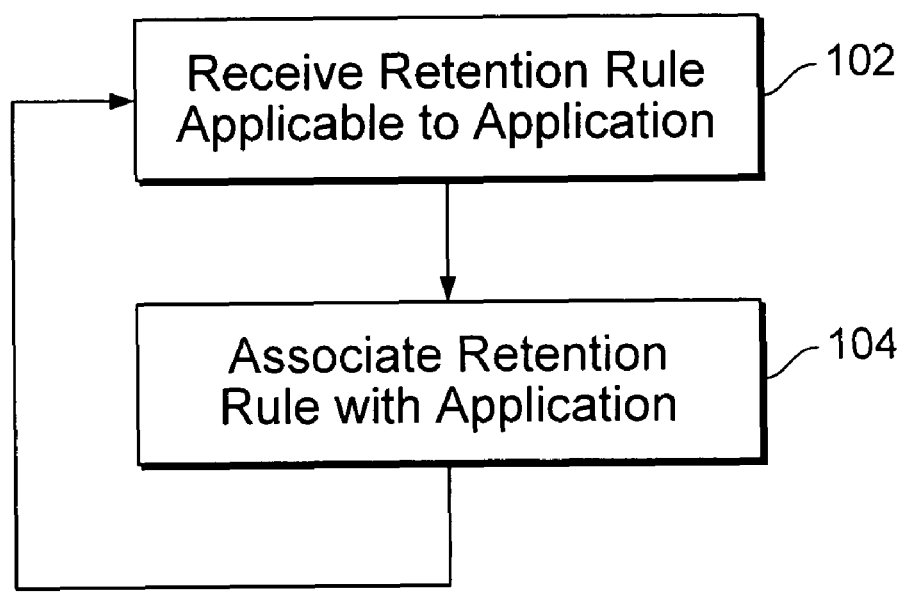
FIG. 1 is a flow chart of a process used in one embodiment to implement application-specific management policies on a content addressable storage device.

FIG. 1 is a flow chart of a process used in one embodiment to implement application-specific management policies on a content addressable storage device. A retention (or other data management) policy or rule applicable to data stored on the CAS device by a particular application (or other source) is received (102). The rule (or policy) is associated on the CAS device with the application (or other source) (104). In one embodiment, the retention (or other management) rule or policy is associated with the corresponding application (or other data source) by making one or more entries in a table, database, or other data repository maintained to track such rules and policies.

Figure 2:
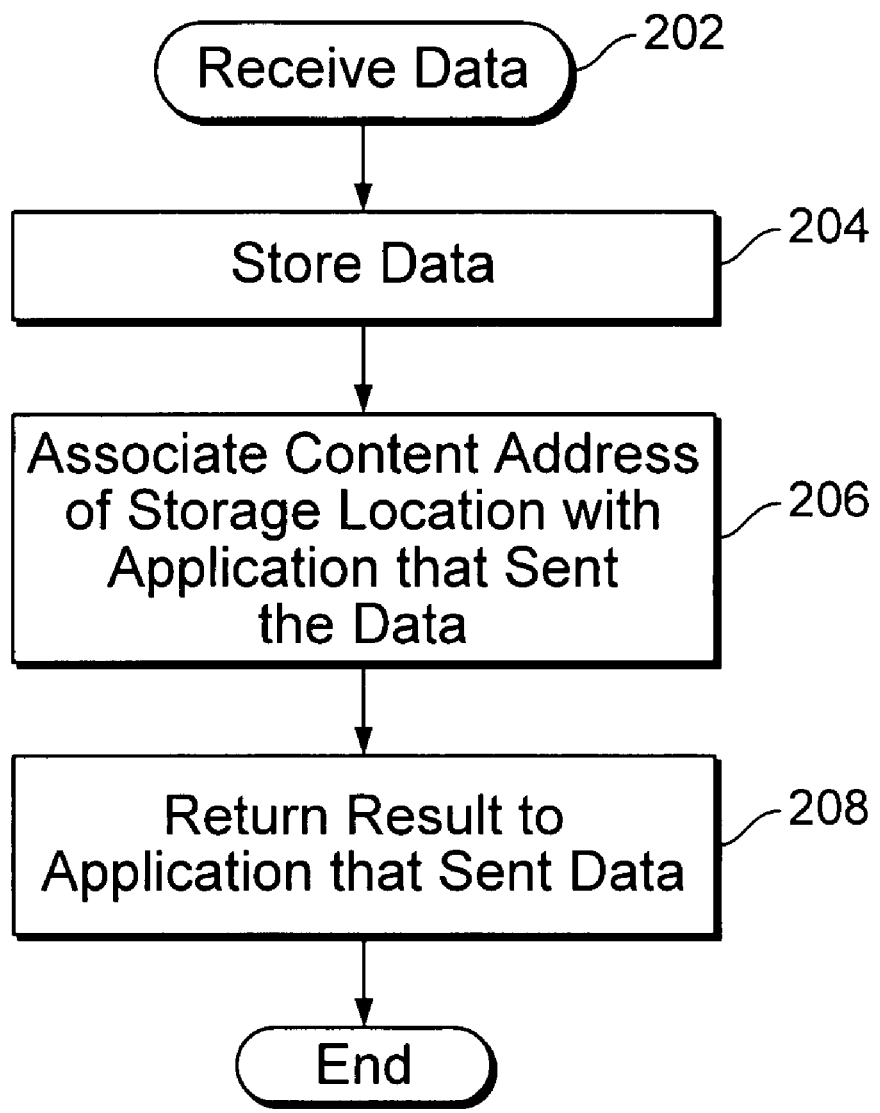
FIG. 2 is a flow chart of a process used in one embodiment to receive and process data on a CAS device configured to implement application specific management policies.

FIG. 2 is a flow chart of a process used in one embodiment to receive and process data on a CAS device configured to implement application specific management policies. Data is received (202). The data is stored (204). In one embodiment, storing the data includes calculating a content address based at least in part on the content of the data and storing the data in a storage location associated with the content address. A content address associated with the storage location at which the data is stored on the CAS device is associated on the CAS device with the application (or other source) that sent the data (206). In one embodiment, 206 includes making in a table or other data repository associated with the sending application (or other source) on the CAS device an entry that associates the content address with the sending application (or other source). In one embodiment, additional information, such as the date/time the data was stored, also is recorded. In one embodiment, the CAS device is configured to maintain for the sending application (or other source) a content map that associates the content address for each data object stored by the application on the CAS device with the corresponding local data object identifier (e.g., file name and/or path) by which the data object is known on a local host associated with the sending application, as described more fully in co-pending U.S. patent application Ser. No. 10/984,686, which is incorporated herein by reference above. In one such embodiment, the association between the content address and the sending application that is made in 206 includes making an entry in the content map for the sending application. A result of the operation is returned to the sending application (or other source) (208), after which the process ends. In one embodiment, if the data is stored successfully the report includes an indication that the operation was completed successfully.

Figure 3:
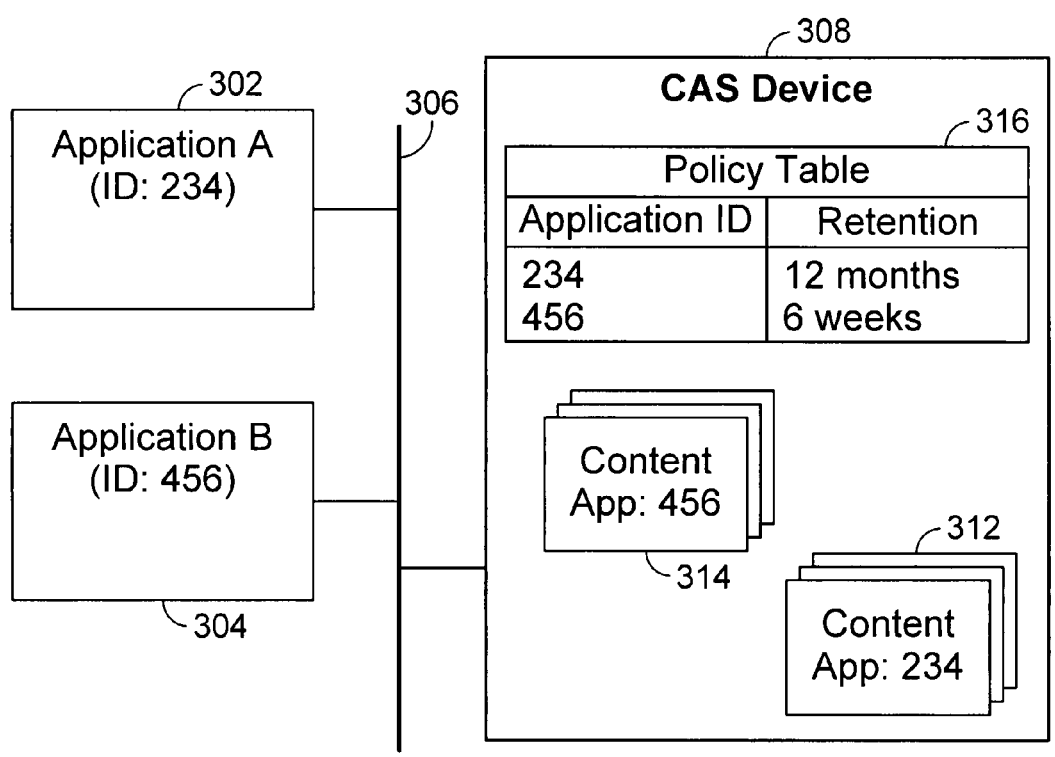
FIG. 3 is a block diagram illustrating a CAS device used in one embodiment to implement application specific management policies.

FIG. 3 is a block diagram illustrating a CAS device used in one embodiment to implement application specific management policies. An application A (302), having an application identification number "234" associated with it, and an application B (304), having an application identification number "456" associated with it, are connected via a network (e.g., a TCP/IP network) 306 to a CAS device 308. The application identifier (e.g., "234" and "456") are generated in one embodiment by the CAS device 308 to identify uniquely each application that sends data to the CAS device 308 to be stored. In other embodiments, the sending applications themselves or a third party may generate the application identifier.

The CAS device 308 stores data objects sent to it for storage by applications such as applications 302 and 304. CAS device 308 is configured to track which data objects were sent by which sending application or other source. In the example shown in FIG. 3, the data objects comprising a first set of data objects 312 stored on CAS device 308 are associated with application A (302) and the data objects comprising a second set of data objects 314 are associated with application B (304). CAS device 308 includes a policy table 316 in which the retention (or other management) policy(ies) associated with each application that has stored data on the CAS device 308 is/are listed. In the example shown, the policy table 316 indicates that data stored by application A (302) is to be retained for 12 months whereas data stored by application B (304) is retained for only 6 weeks. CAS device 308 is configured to implement the retention (or other management) policies listed in policy table 316 by monitoring the data objects stored on CAS device 308 and deleting data object once the retention period applicable to the data set (e.g., sending application) with which the data object is associated has expired (or taking other appropriate action, depending on the applicable policy). In the case of a retention policy, e.g., CAS device 308 in one embodiment is configured to periodically scan the data objects of each set and delete those objects that have been stored on CAS device 308 for a period greater than the retention period associated with the data set, as described more fully below.

While in the example shown in FIG. 3 different management (e.g., retention) policies are applied to different data objects based on the respective sending application with which each data object is associated, in other embodiments different management policies may be implemented on different data sets defined by other and/or additional characteristics, such as based on a code, flag, or other indication provided by the sending source to indicate the data set with which a particular data object is to be associated for purposes of implementing one or more data set-specific management policies on a basis other than the identity of the sending application.

In one embodiment, CAS device 308 has a communication interface, such as a network interface card (NIC), to facilitate communication via network 306 with applications 302 and 304. CAS device 308 in addition includes a memory used to store policy table 316 and one or more content maps to track which data is associated with which sending application (or other source), one or more storage nodes configured to store data sent to the CAS device 308 by applications such as applications 302 and 304 (e.g., the data sets 312 and 314), and one or more processors configured to perform the data storage, retrieval, and management functions of the CAS device 308 and the application specific management operations described herein. One or more of the one or more processors may include a general purpose processor (e.g., CPU) configured by software to perform such functions and operations, and/or an application specific integrated circuit, field programmable logic device, or other device so configured.

Figure 4:
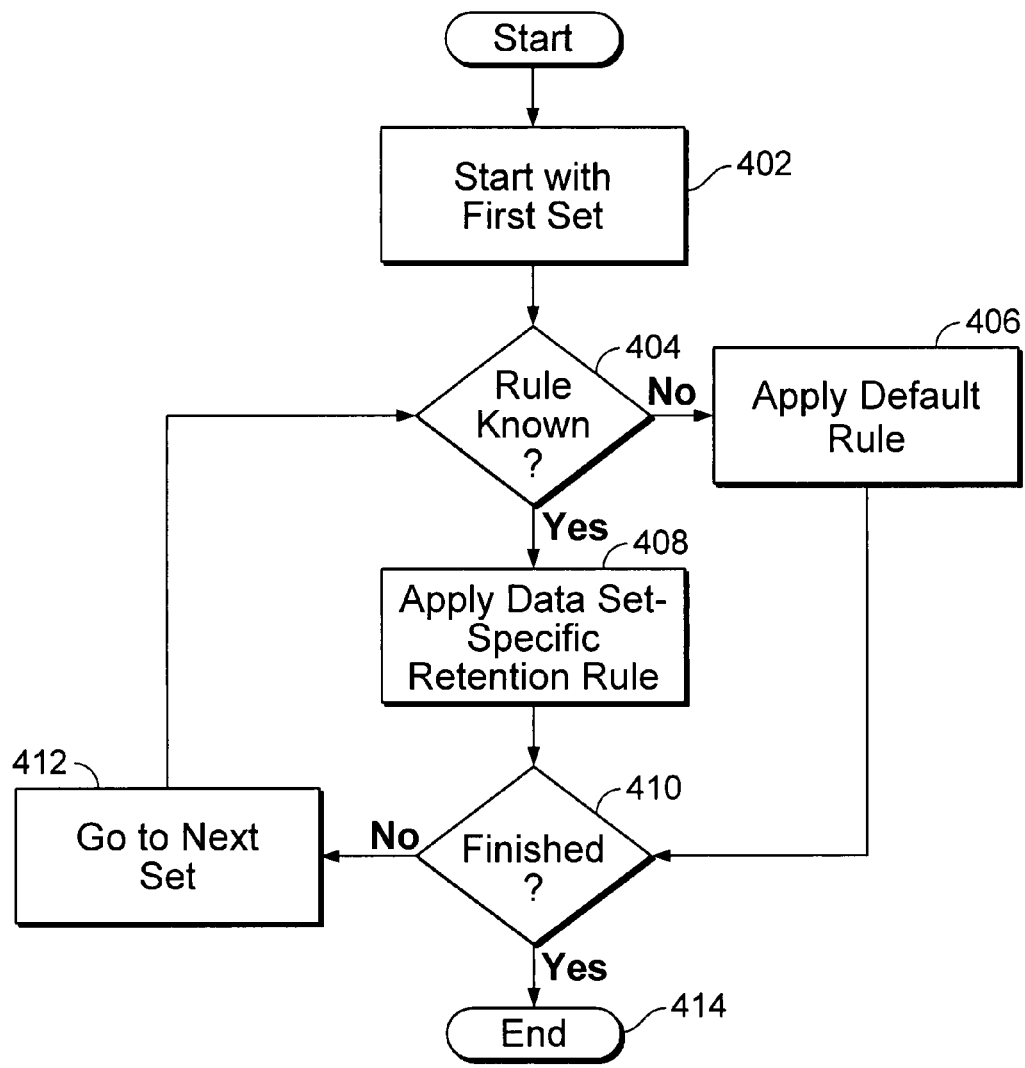
FIG. 4 is a flow chart illustrating a process used in one embodiment to apply application (or other data set) specific management policies to data stored on a content addressed storage device.

FIG. 4 is a flow chart illustrating a process used in one embodiment to apply application (or other data set) specific management policies to data stored on a content addressed storage device. The process starts with a first data set, e.g., the data set comprising the data objects stored on the CAS device by a particular application (402). It is determined whether the retention (or other management) rule or policy applicable to data objects in the data set is known (404). If the data set specific rule or policy is not known (e.g., there is no entry for the data set in a policy table such as policy table 316 of FIG. 3), a default rule is applied (406). Each data object in the set is checked to determine whether it has been stored for a period equal to or greater than a default retention period, for example. If the data set specific rule or policy is known (404), the data set-specific rule or policy (e.g., retention period) is applied to data objects in the data set (408). Once the applicable data set-specific or default rule has been applied, it is determined whether the data set just processed is the last data set required to be processed in the current iteration of the process of FIG. 4 (410). In one embodiment, the process of FIG. 4 is performed periodically, e.g., hourly, daily, weekly, etc., and all of the data sets stored on the CAS device are cycled through on the prescribed periodic basis. If the data set just completed is not the last to be processed, the process of FIG. 4 advances to the next data set to be processed (412) and 404-410 are repeated for that data set. If the data set just completed is the last to be processed (410), the process ends (414).

Figure 5:
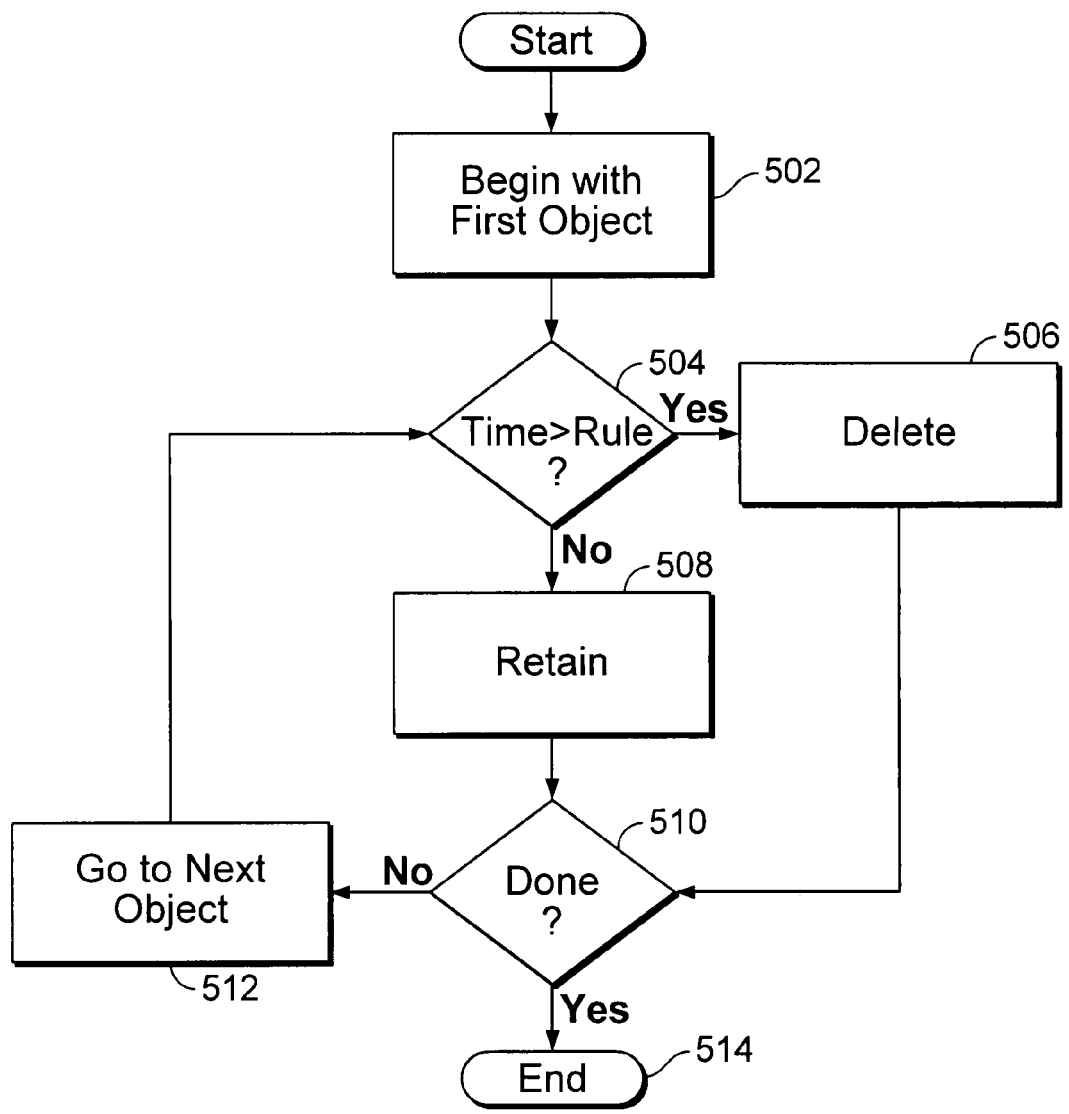
FIG. 5 is a flow chart of a process used in one embodiment to apply a data set (e.g., application) specific management (e.g., retention) rule or policy to a set of data stored on a CAS device.

FIG. 5 is a flow chart of a process used in one embodiment to apply a data set (e.g., application) specific management (e.g., retention) rule or policy to a set of data stored on a CAS device. The process of FIG. 5 is used in one embodiment to implement 406 and 408 of FIG. 4. The process begins by processing a first data object in the data set (502). It is determined whether the data object has been stored on the CAS device for a period that is greater than the applicable retention period (504). If so, the data object is deleted (506); otherwise the data object is retained (508). It is determined whether the data object just processed is the last data object in the set (510). If not, the process advances to the next data object in the set (512) and 504-510 are repeated with respect to that data object. If the data object just process is the last in the set (510), the process ends (514).

Using the approaches described herein, applications that store data on a CAS device need not be configured to implement retention and/or other management policies with respect to such data. Instead, the CAS device itself can implement such policies on a sending application (or other data set) specific basis.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for implementing one or more data set specific management policies with respect to data stored on a content addressed storage device, comprising:
   associating each data object stored on the content addressed storage device with one of a plurality of data sets;
   associating with at least each of a subset of said plurality of data sets a corresponding data set specific management policy; and
   applying to the data objects of each data set with which a corresponding data set specific management policy has been associated the data set specific management policy associated with that data set.

2. The method as recited in claim 1, wherein associating each data object stored on the content addressed storage device with one of a plurality of data sets includes associating each data object with an application from which the data object was received.

3. The method as recited in claim 1, wherein associating each data object stored on the content addressed storage device with one of a plurality of data sets includes associating each data object with an application identifier associated with an application from which the data object was received.

4. The method as recited in claim 1, further comprising:
   receiving a received data set specific management policy; and
   associating the received data set specific management policy with a corresponding data set to which the received data set specific management policy applies.

5. The method as recited in claim 4, wherein associating the received data set specific management policy with a corresponding data set to which the received data set specific management policy applies includes making an entry in a policy table.

6. The method as recited in claim 4, wherein associating the received data set specific management policy with a corresponding data set to which the received data set specific management policy applies includes associating the received data set specific management policy with a sending application from which the data set specific management policy was received.

7. The method as recited in claim 1, wherein the management policy includes a data retention policy.

8. A content addressed storage device, comprising:
   a memory configured to store one or more data set specific management policies; and a processor configured to:
   associate each data object stored on the content addressed storage device with one of a plurality of data sets;
   associate with at least each of a subset of said plurality of data sets a corresponding data set specific management policy; and
   apply to the data objects of each data set with which a corresponding data set specific management policy has been associated the data set specific management policy associated with that data set.

9. The content addressed storage device as recited in claim 8, wherein the processor is configured to associate each data object stored on the content addressed storage device with one of a plurality of data sets by associating each data object with an application from which the data object was received.

10. The content addressed storage device as recited in claim 8, wherein the processor is configured to associate each data object stored on the content addressed storage device with one of a plurality of data sets by associating each data object with an application identifier associated with an application from which the data object was received.

11. The content addressed storage device as recited in claim 8, wherein the processor is further configured to:
   receive a received data set specific management policy; and
   associate the received data set specific management policy with a corresponding data set to which the received data set specific management policy applies.

12. The content addressed storage device as recited in claim 11, wherein the processor is configured to associate the received data set specific management policy with a corresponding data set to which the received data set specific management policy applies by making an entry in a policy table.

13. The content addressed storage device as recited in claim 11, wherein the processor is configured to associate the received data set specific management policy with a corresponding data set to which the received data set specific management policy applies by associating the received data set specific management policy with a sending application from which the data set specific management policy was received.

14. The content addressed storage device as recited in claim 8, wherein the management policy includes a data retention policy.

15. A computer program product for implementing one or more data set specific management policies with respect to data stored on a content addressed storage device, the computer program product being embodied in a computer readable medium and comprising computer instructions on a tangible medium for:
   associating each data object stored on the content addressed storage device with one of a plurality of data sets;
   associating with at least each of a subset of said plurality of data sets a corresponding data set specific management policy; and
   applying to the data objects of each data set with which a corresponding data set specific management policy has been associated the data set specific management policy associated with that data set.

16. The computer program product as recited in claim 15, wherein associating each data object stored on the content addressed storage device with one of a plurality of data sets includes associating each data object with an application from which the data object was received.

17. The computer program product as recited in claim 15, wherein associating each data object stored on the content addressed storage device with one of a plurality of data sets includes associating each data object with an application identifier associated with an application from which the data object was received.

18. The computer program product as recited in claim 15, the computer program product further comprising computer instructions for:
  receiving a received data set specific management policy; and
  associating the received data set specific management policy with a corresponding data set to which the received data set specific management policy applies.

19. The computer program product as recited in claim 18, wherein associating the received data set specific management policy with a corresponding data set to which the received data set specific management policy applies includes making an entry in a policy table.

20. The computer program product as recited in claim 18, wherein associating the received data set specific management policy with a corresponding data set to which the received data set specific management policy applies includes associating the received data set specific management policy with a sending application from which the data set specific management policy was received.

21. The computer program product as recited in claim 15, wherein the management policy includes a data retention policy.

* * * * *